United States Patent
Bui et al.

(10) Patent No.: US 9,472,236 B1
(45) Date of Patent: Oct. 18, 2016

(54) REEL ROTATION SYNCHRONIZATION FOR UPDATING TIME-VARYING FILTER PARAMETERS

(71) Applicant: INTERNATIONAL BUSINESS MACHINES CORPORATION, Armonk, NY (US)

(72) Inventors: Nhan X. Bui, Tucson, AZ (US); Angeliki Pantazi, Thalwil (CH); Tomoko Taketomi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/808,137

(22) Filed: Jul. 24, 2015

(51) Int. Cl.
G11B 5/09 (2006.01)
G11B 20/10 (2006.01)
G11B 5/008 (2006.01)

(52) U.S. Cl.
CPC ..... *G11B 20/10046* (2013.01); *G11B 5/00813* (2013.01)

(58) Field of Classification Search
None
See application file for complete search history.

(56) References Cited

U.S. PATENT DOCUMENTS

| | | | | |
|---|---|---|---|---|
| 2005/0174681 A1* | 8/2005 | Berman | ................. | G11B 5/584 360/77.12 |
| 2007/0025004 A1 | 2/2007 | Stein et al. | | |
| 2008/0100953 A1* | 5/2008 | Sosseh | ................. | G11B 5/5582 360/78.04 |
| 2011/0043945 A1* | 2/2011 | Cherubini | ............. | G11B 5/584 360/77.12 |
| 2011/0102934 A1* | 5/2011 | Bui | ..................... | G11B 5/00813 360/75 |
| 2012/0087031 A1* | 4/2012 | Goker | ............. | G11B 20/10046 360/39 |
| 2014/0268391 A1* | 9/2014 | Liao | ................. | G11B 20/10046 360/45 |
| 2015/0062744 A1 | 3/2015 | Cherubini et al. | | |
| 2015/0062747 A1 | 3/2015 | Lantz et al. | | |

FOREIGN PATENT DOCUMENTS

| | | |
|---|---|---|
| DE | 102013205074 A1 | 10/2013 |
| JP | H09161357 A | 6/1997 |
| WO | 9928906 A1 | 6/1999 |
| WO | 2014032458 A1 | 3/2014 |

OTHER PUBLICATIONS

Zhong et al, "Feedforward Control to Attenuate Tension Error in Time-varying Tape Systems" pp. 105-110, 2008 American Control Conference Jun. 11-13, 2008 Seattle, WA, USA.

\* cited by examiner

*Primary Examiner* — Peter Vincent Agustin
(74) *Attorney, Agent, or Firm* — Griffiths & Seaton PLLC

(57) ABSTRACT

Methods, systems, and computer program product embodiments for improving track-follow control in a tape storage system using a time-varying filter, by a processor device, are provided. In one embodiment, a method comprises, dynamically updating coefficients used to determine parameters of the time-varying filter based upon a reel radius and a reel rotation to reduce computation delay.

12 Claims, 11 Drawing Sheets

| | RADIUS (m) | VELOCITY | t FOR 1 rot (ms) | 1x FREQ. | 16x FREQ. | 32x FREQ. | FREQ. CHANGE % |
|---|---|---|---|---|---|---|---|
| EMPTY REEL | 0.02200 | 6 | 23 | 43 | 694 | 1389 | |
| EMPTY +5 rots | 0.02203 | 6 | 23 | 43 | 694 | 1387 | |
| EMPTY +10 rots | 0.02206 | 6 | 23 | 43 | 693 | 1385 | 0.272 |
| FULL REEL | 0.04700 | 6 | 49 | 20 | 325 | 650 | |

FIG. 9

REEL ROTATION SYNCHRONIZATION FOR UPDATING TIME-VARYING FILTER PARAMETERS

BACKGROUND OF THE INVENTION

1. Field of the Invention

The present invention relates in general to computers, and more particularly to a method, system, and computer program product for a maintaining time-varying filter for high-frequency reel disturbance rejection in tape storage systems.

2. Description of the Related Art

In today's society, computer systems are commonplace. Computer systems may be found in the workplace, at home, or at school. Computer systems may include data storage systems, or disk storage systems, to process, store, and archive data. Large data archiving solutions typically use tape library systems where workstations and client devices are connected to one or more servers, and the servers are connected to one or more libraries. In data centers, such as those providing imaging for health care, entertainment, weather, military, and space exploration applications, these servers and libraries are often interconnected in a grid-computing environment.

SUMMARY OF THE DESCRIBED EMBODIMENTS

Various embodiments for improving track-follow control in a tape storage system using a time-varying filter, by a processor device, are provided. In one embodiment, a method comprises, dynamically updating coefficients used to determine parameters of the time-varying filter based upon a reel radius and a reel rotation to reduce computation delay.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 9 illustrates a block diagram of a tape controller filtration system featuring aspects of the present invention;

DETAILED DESCRIPTION OF THE DRAWINGS

Figure 1A:
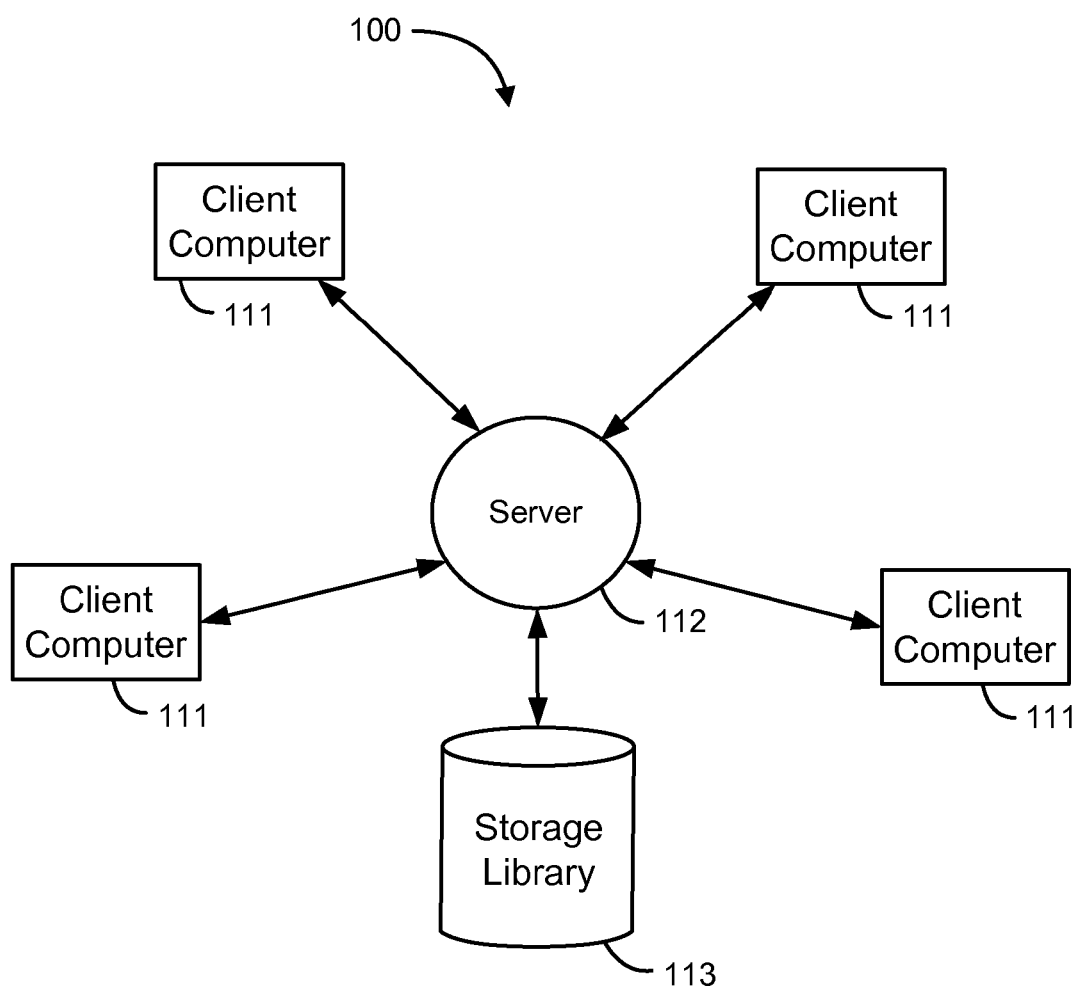
FIG. 1A is a block diagram illustrating a typical client-server library system for archiving data in which aspects of the invention can be implemented.

With increasing demand for faster, more powerful and more efficient ways to store information, optimization of storage technologies is becoming a key challenge, particularly in tape drives. In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media. An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

Tape drives have conventionally used a servo system to keep the write/read heads in the correct lateral location on the tape. The difference between the correct location and actual location of the heads is referred to as position error signal (PES). Current servo systems implement a fixed threshold such that if the PES is larger than the threshold, the writing of the heads will be stopped to prevent overwriting of adjacent tracks. This threshold is referred to as the stopwrite (SW) threshold. However, it is difficult to pick the appropriate SW threshold due to the differences in distributions of PES data for different drives and/or different tapes. Another drawback is that when a particular predetermined SW threshold is used, the drive may write the data without any apparent error, when actually the adjacent tracks have been overwritten, rendering the data therein unreadable. This result is highly undesirable.

The required capacity scaling of future tape systems is likely to be achieved primarily through aggressive track density scaling. To achieve such required track densities, significant improvements must be made in the area of ultra-precise positioning of the recording head over the data tracks. Accordingly, the performance of track-follow mechanisms of tape drives must be dramatically improved. As alluded to previously, the basic functionality of track-follow control mechanisms are to reduce the misalignment between the tape and the recording head created by lateral motion of the flexible medium. Lateral tape motion (LTM) arises primarily from imperfections in tape guide rollers and reels, such as run-outs, eccentricities and other tape path imperfections.

As an example, the IBM LTO7-HH drive provides a more challenging environment for improving the servo performance due to higher resonance modes by the actuator and the increased lateral tape motion disturbances, which come primarily from the rollers and reels. Compensating disturbances from the reels themselves becomes challenging because the frequency of such disturbances varies from the beginning-of-tape (BOT) to end-of-tape (EOT). The reel disturbance frequency may be described as a function of tape speed and the radius of the reel. Additionally, disturbances also appear at multiples of the reel disturbance frequency (e.g. 16× or 32×). At these multiples, higher frequency disturbance components are beyond the closed-loop bandwidth and are not compensated by traditional control systems.

Current track-follow control architectures include one or more conventional peak filters. The center frequency of each peak filter may be adjusted based on the reel disturbance frequency. Such filtration works well for low-frequency reel disturbances (e.g. 1×). However, for mitigating disturbances at higher multiples of the reel frequency (e.g. 48×), inserting a conventional peak filter adversely affects the closed-loop response and reduces the stability margins of the controller system.

Accordingly, in view of the foregoing, the present invention provides embodiments for implementing a time-varying filter inserted into the closed-loop controller, which is able to enhance the reel disturbance rejection of the closed-loop system even at higher frequencies.

As will be further described, this time-varying filter implementation is designed to suppress disturbances generated from reels. The frequency of such disturbances may be defined as a function of the tape velocity, the radius of the machine or file reel, and a factor determined by the desired multiple of the reel frequency. The time-varying filter is inserted as a second-order filter, and may be written in polynomial form, where the parameters (damping ratio, natural frequency) of the numerator and denominator are time-varying and defined as functions of the desired reel disturbance frequency. These functions, which determine the specific filter parameter, may be approximated by the closed-loop design methodology used in track-follow controller designs. In one example, an H-infinity procedure may be repetitively applied for several instances of the reel frequency from BOT to EOT, and the required functions may be approximated from the varying feature of the resulting controllers. Using the mechanisms of the present invention, this time-varying filter may be included in a closed-loop controller system without affecting the response of the system, while enhancing the disturbance rejection at desired reel frequencies. Furthermore, the approximated functions used to determine the time-varying second-order filter parameters are simply and efficiently implemented into existing controller systems.

Turning now to the Figures, and in particular to FIG. 1A, there is depicted a block diagram of client-server library system 100 for archiving data in which aspects of the present invention may be implemented. The system 100 includes multiple client computers 111 from which data is transmitted to a server 112 for archiving in a data storage library 113. The client computers 111 also retrieve previously archived data from the library 113 through the server 112. Client computers 111 may be personal computers, portable devices (e.g., PDAs), workstations, or server systems, such as the IBM TS7720™. The client computers 111 may be connected to the server 112 through a local area network such as an Ethernet network, or by SCSI, iSCSI, Fibre Channel, Fibre Channel over Ethernet, or Infiniband. Server 112 may again be an IBM TS7740™ server, TS7720™ server, or other servers. Similarly, the data storage library 113 may be connected to the server 112 using a high data rate connection such as an optical or copper fiber channel, SCSI, iSCSI, Ethernet, Fibre Channel over Ethernet or Infiniband.

Figure 1B:
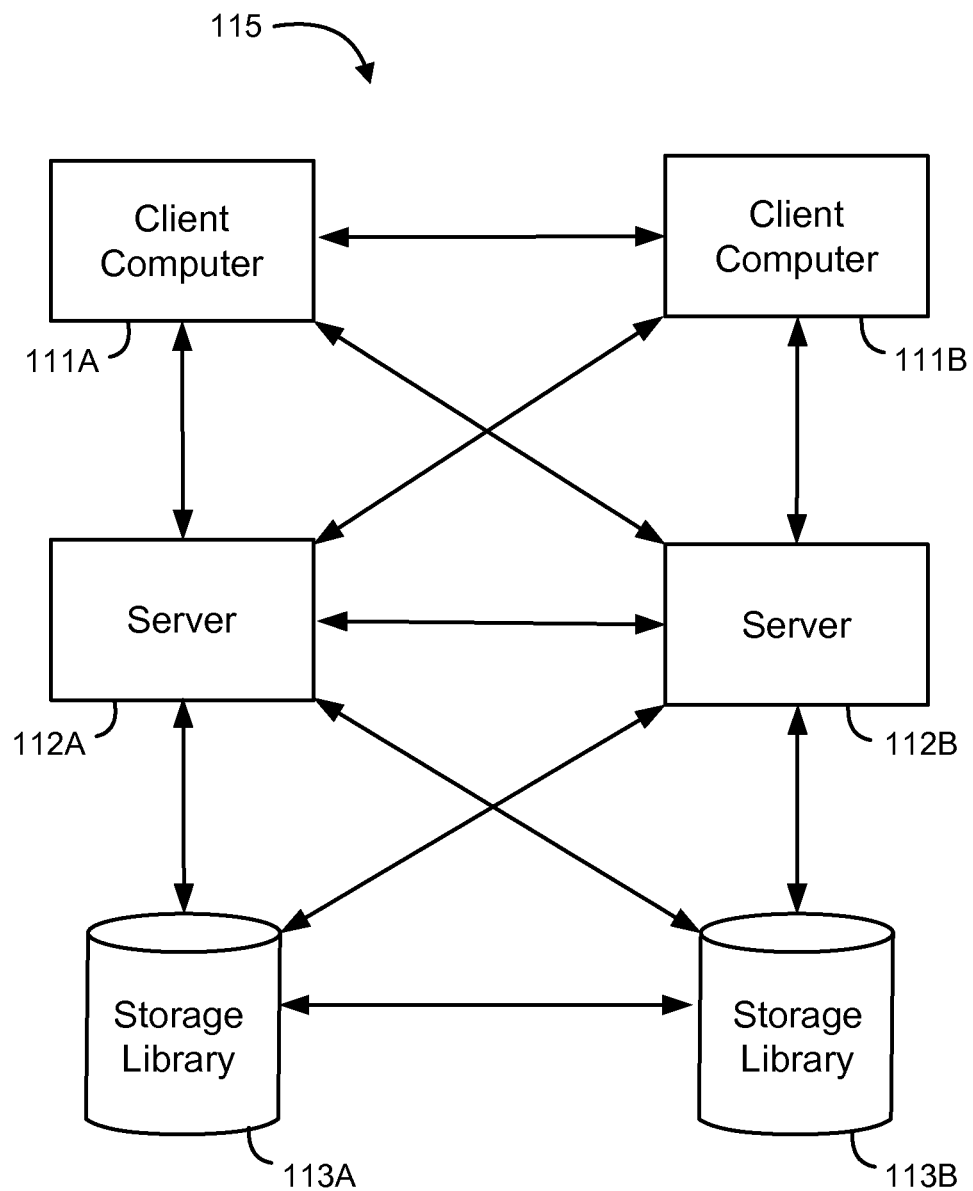
FIG. 1B is a block diagram illustrating a typical grid computing client-server library environment for archiving data in which aspects of the invention can be implemented.

FIG. 1B illustrates a block diagram of a typical grid computing library environment 115 for archiving data. The library environment 115 includes multiple client computers 111A and 111B interconnected to one another and to multiple server systems 112A and 112B. The server systems 112A and 112B are interconnected to one another and to multiple tape libraries 113A and 113B, which are also interconnected to one another.

Figure 2:
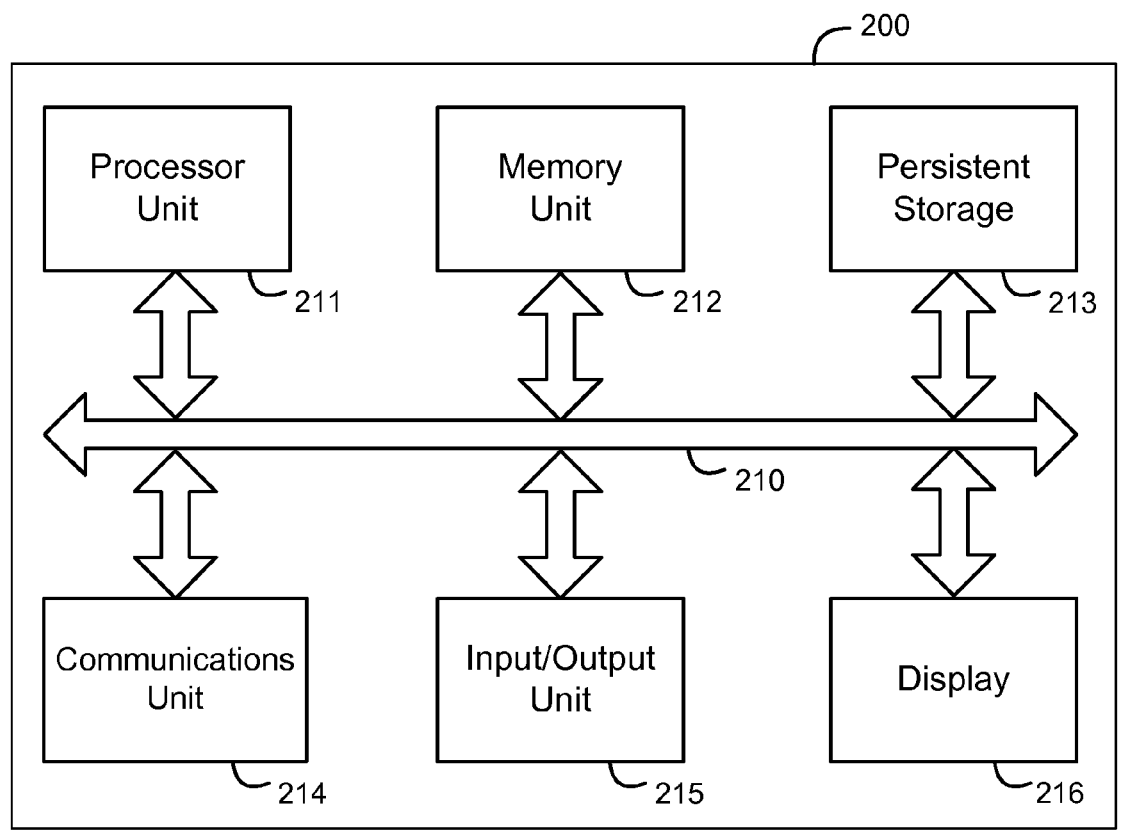
FIG. 2 is a block diagram illustrating a representative computer system which may be used as a client or a server computer.

FIG. 2 illustrates a block diagram of a data processing system that may be used as a client computer 111 or server system 112. As shown, a data processing system 200 includes a processor unit 211, a memory unit 212, a persistent storage 213, a communications unit 214, an input/output unit 215, a display 216 and a system bus 210. Computer programs are typically stored in the persistent storage 213 until they are needed for execution, at which time the programs are brought into the memory unit 212 so that they can be directly accessed by the processor unit 211. The processor unit 211 selects a part of memory unit 212 to read and/or write by using an address that the processor 211 gives to memory 212 along with a request to read and/or write. Usually, the reading and interpretation of an encoded instruction at an address causes the processor 211 to fetch a subsequent instruction, either at a subsequent address or some other address. The processor unit 211, memory unit 212, persistent storage 213, communications unit 214, input/output unit 215, and display 216 interface with each other through the system bus 210.

Figure 3:
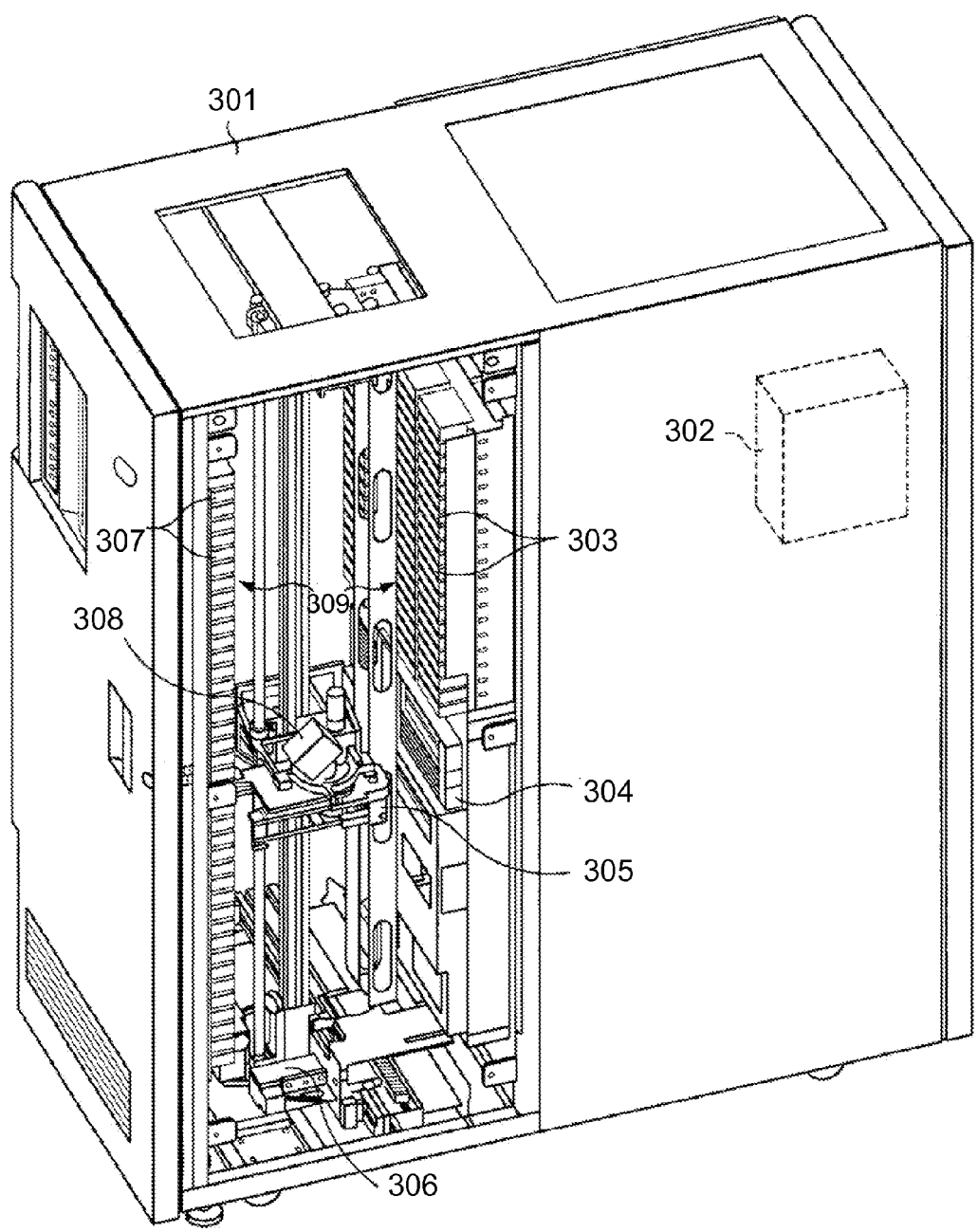
FIG. 3 illustrates a typical data storage tape library for archiving data in which aspects of the present invention may be implemented upon.

FIG. 3 illustrates an example of a data storage library 301 which may be found in an environment of an implementation of the present invention. The library 301 is an automated tape library that accommodates multiple tape drives 304 for reading and writing on tape media, such as single-reel or two-reel magnetic tape cartridges. Examples of the library 301 include IBM TS3400™ and TS3500™ Tape Libraries, IBM TotalStorage™ 3494 Tape Libraries, and IBM 3952™

Tape Frames Model C20, which store magnetic tape cartridges and use IBM TS1130™ tape drives. Other examples of the library 301 include IBM TS3310™ and TS3100/3200™ tape libraries which store magnetic tape cartridges and use IBM LTO (Linear Tape Open) tape drives. A plurality of tape media 303 are stored in banks or groups of storage slots 309. Tape media may encompass a variety of media, such as that contained in magnetic tape cartridges, magnetic tape cassettes, and optical tape cartridges, in various formats. For universal reference to any of these types of media, the terms "tape media" or "media" are used herein, and any of these types of containers are referred to as "tape cartridges" or "cartridges" herein. An access robot 306, including a cartridge picker 305 and a bar code reader 308 mounted on the picker, transports a selected cartridge 303 between a storage slot 309 and a drive 304.

The library 301 further has a library controller 302 which includes at least one microprocessor. The library controller 302 may serve to provide an inventory of the cartridges 303 and to control the library 301. Typically, the library controller 302 has suitable memory and data storage capability to control the operation of the library 301. The library controller 302 controls the actions of the access robot 306, cartridge picker 305, and bar code reader 308. The library controller 302 is interconnected through an interface to one or more host processors, which provides commands requesting access to particular tape media or to media in particular storage slots. A host, either directly, or through the library controller, controls the actions of the data storage drives 304. Commands for accessing data or locations on the tape media and information to be recorded on, or to be read from, selected tape media are transmitted between the drives 304 and the host. The library controller 302 is typically provided with a database for locating the tape cartridges 303 in the appropriate storage slots 309 and for maintaining the cartridge inventory.

Figure 4:
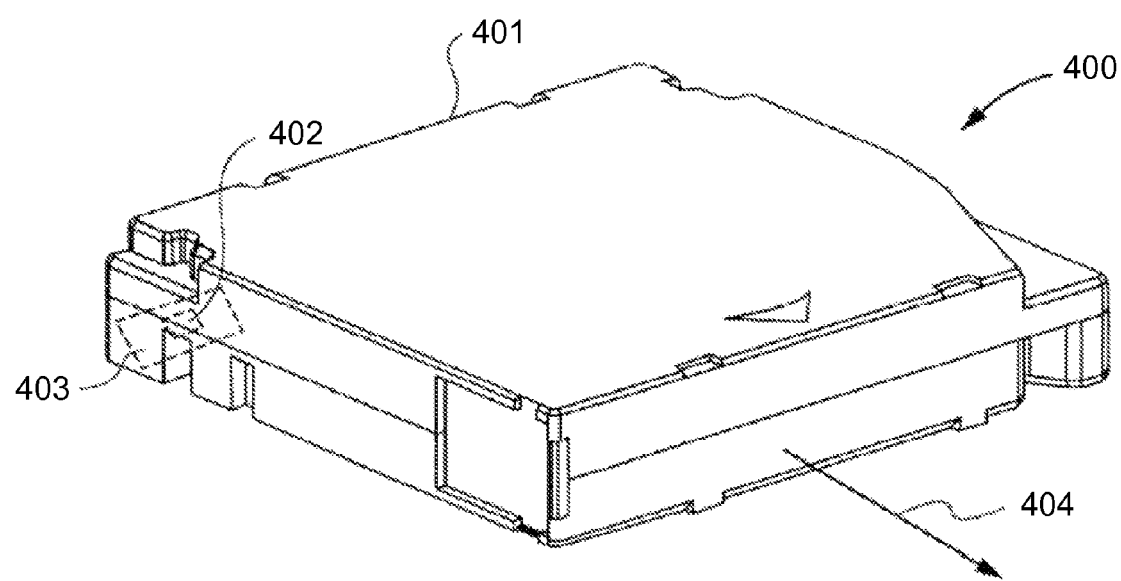
FIG. 4 illustrates an example of a tape cartridge media for use in the data storage tape library in FIG. 3.

FIG. 4 illustrates a perspective view of an exemplary tape cartridge 400 for use in a tape drive system 304 of FIG. 3, and fundamental to the present invention. The tape cartridge 400 has a reel (not shown) for holding tape media (not shown) which is wound around the reel hub. The tape cartridge 400 further includes an RFID cartridge memory 402 which is on printed circuit board 403, for wireless interfacing with the tape drive 304 and the cartridge picker 305. The tape cartridge 400 is referred to as a single-reel cartridge as it includes only one tape reel which acts as a supply reel during operation. A take-up reel is provided in the tape drive 304 for receiving the tape media when the tape media is being unspooled from the tape reel. In a different design of the tape drive 304, a take-up reel might be included in the cartridge 400 itself rather than in the tape drive 304. Such a tape cartridge is referred to as a dual-reel cartridge. Cartridge 400 is inserted along direction 404 into tape drive 304.

Figure 5:
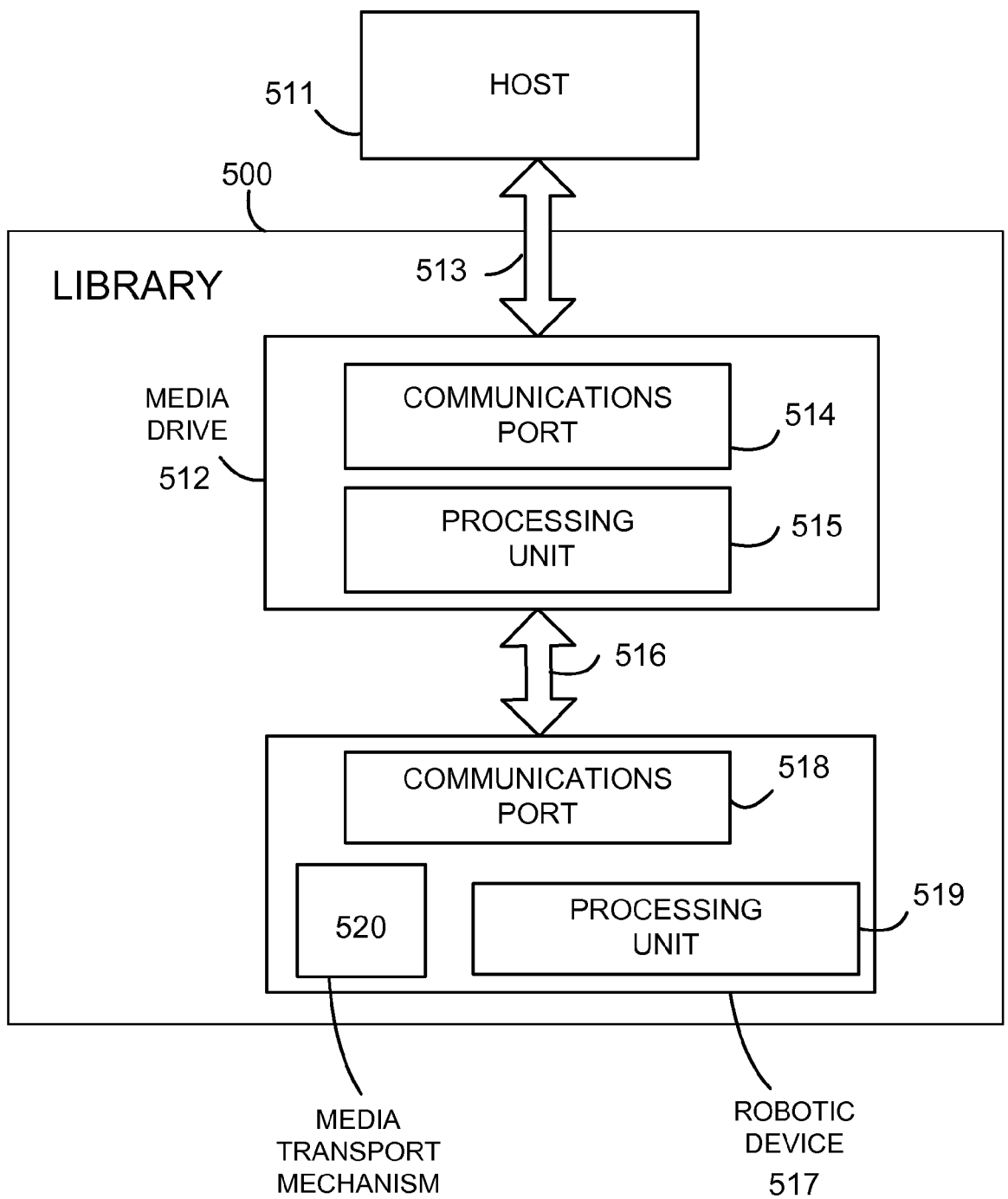
FIG. 5 illustrates a block diagram showing an exemplary data storage tape library in communication with a host computer for providing aspects of the invention.

FIG. 5 is a block diagram showing the functional components of an exemplary data storage tape library 500 in communication with a host computer 511 for providing aspects of the invention. The library 500 is attached to a host 511, and includes a media drive 512 and a robotic device 517. Data and control path 513 interconnects the host 511 and drive 512. Similarly, data and control path 516 interconnects the drive 512 and the robotic device 517. The paths 513 and 516 may comprise suitable means for conveying signals, such as a bus with one or more conductive members (such as wires, conductive traces, cables, etc.), wireless communications (such as radio frequency or other electromagnetic signals, infrared communications, etc.), and fiber optic communications. Furthermore, the paths 513 and 516 may employ serial, parallel, or another communications format, using digital or analog signals as desired. Communications with the media drive 512 and robotic device 517 are through communications ports 514 and 518, respectively.

Both the drive 512 and the robotic device 517 include respective processing units 515 and 519. The library 500 manages the positioning and access of removable or portable data storage media such as magnetic tape, cartridge 400, optical tape, optical disk, removable magnetic disk drive, CD-ROM, digital video disk (DVD), flash memory, or another appropriate format. Some of these types of storage media may be self-contained within a portable container, or cartridge. For universal reference to any of these types of storage media, this disclosure refers to them as media.

The host 511 may be a server, workstation, personal computer, or other means for exchanging data and control signals with the media drive 512. The drive 512 comprises a machine for reading data from and/or writing data to exchanging data with a portable data storage media. The robotic device 517 includes the processing unit 519 and a media transport mechanism 520 coupled to processing unit 519. The media transport mechanism 520 includes servos, motors, arms, grippers, sensors and other robotic, mechanical and electrical equipment to perform functions that include (at least) the transportation of media items between the drive 512, various storage bins (not shown), import/export slots, etc. The mechanism 520 may, for example, comprise an auto-loader mounted to the drive 512, a robotic arm housed inside a mass storage library, or another suitable device. As an example, the mechanism 520 may comprise an access robot 306, cartridge picker 305 and bar code reader 308 from FIG. 3.

Figure 6:
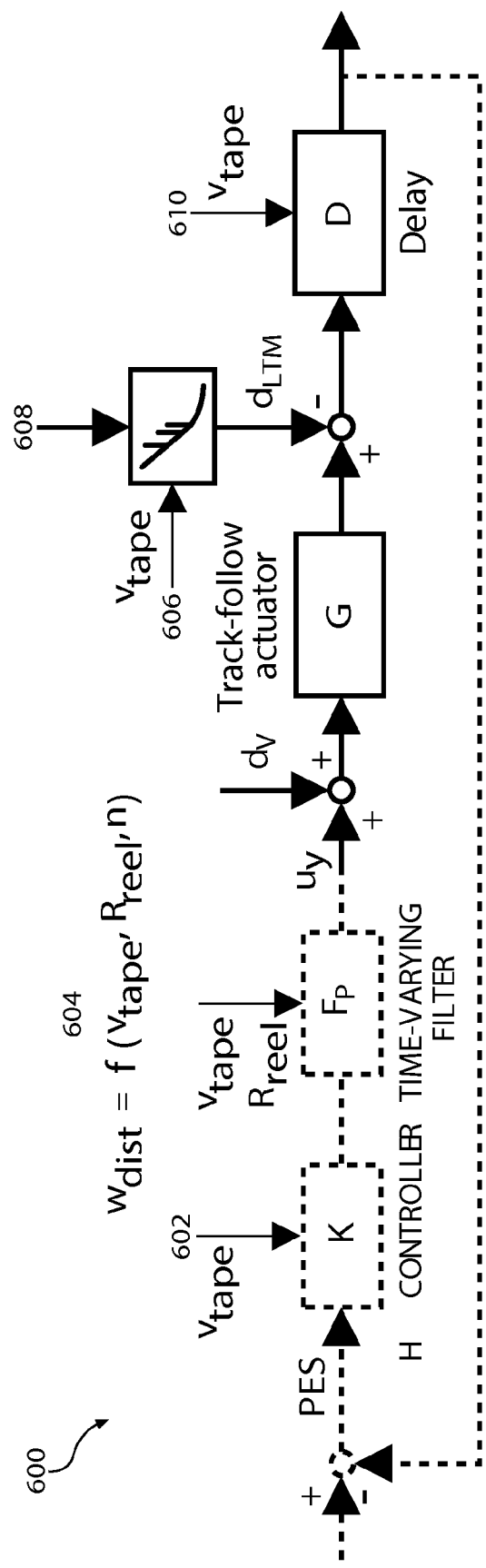
FIG. 6 illustrates a block diagram of a tape controller filtration system featuring aspects of the present invention.

FIG. 6 illustrates one embodiment of an implementation of the time-varying filter controller system 600. An H-infinity controller 602 is the track-follow controller and a time-varying filter 604 is inserted into the closed-loop system 600. This influences the track-follow actuator 606 that follows the tape medium 608 which ultimately provides necessary correction parameters with a measurement delay 610. The closed-loop methodology provides the system 600 with an output control signal to be applied to the track-follow actuator.

The time-varying filter 604 is designed to suppress a disturbance appearing at a frequency $\omega_{dist} = f(v_{tape}, R_{reel}, n)$ defined as a function of the tape velocity $v_{tape}$, the radius of the machine or file reel $R_{reel}$ and a factor n determined by the multiple of the reel frequency. Used as a second-order filter, the time-varying filter 604 may be described according to the equation:

$$F_p = \frac{s^2 + 2\zeta_1 \omega_1 s + \omega_1^2}{s^2 + 2\zeta_2 \omega_2 s + \omega_2^2},$$

where the parameters of the denominator are defined as $\omega_2 = \omega_{dist}$, and $\zeta_2$ is a constant. The parameters of the numerator are time-varying defined as $\omega_1 = g_1(\omega_{dist})$ and $\zeta_1 = g_2(\omega_{dist})$.

To find the parameters for the time-varying filter 604, in one embodiment, an H-infinity controller is implemented with track-follow control specifications and the addition of a peak filter at the design phase for rejection of the required reel frequency (e.g. n=48). The implementation is then repeated for several instances of the reel frequency from BOT to EOT. The second-order parameters are found according the equation above for the designed controller that implements this feature. The variation is found (as a function of the disturbance frequency $\omega_{dist}$) of the numerator parameters $\omega_1$ and $\zeta_1$ for the second-order section. The required functions $g_1(\ )$ and $g_2(\ )$ are then approximated for the time-varying filter 604 implementation. These functions then may be applied to an error feedback signal inserted into the controller system 600 for performing the time-varying filtering.

Figure 7:
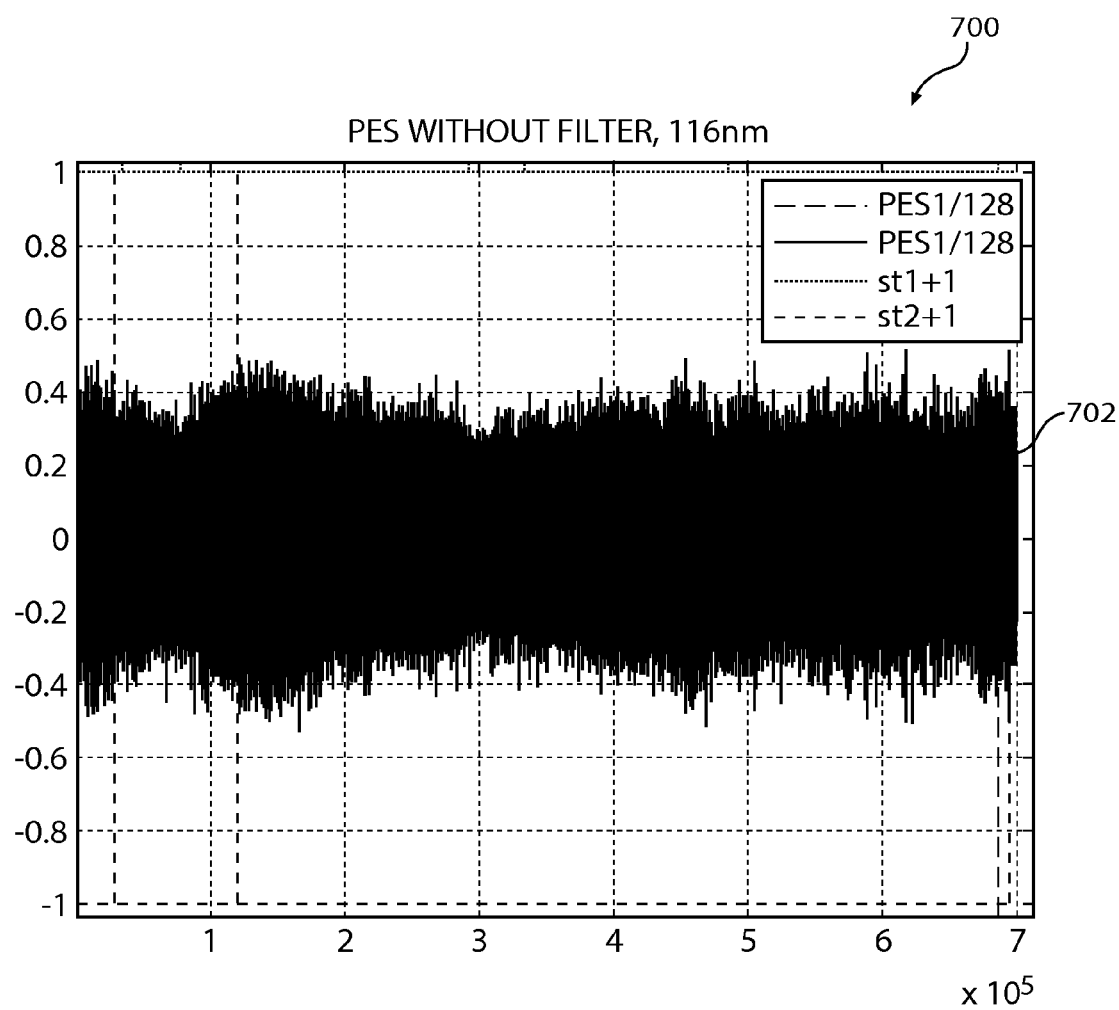
FIG. 7 illustrates a graph of closed-loop position error signal without filtration.
Figure 8:
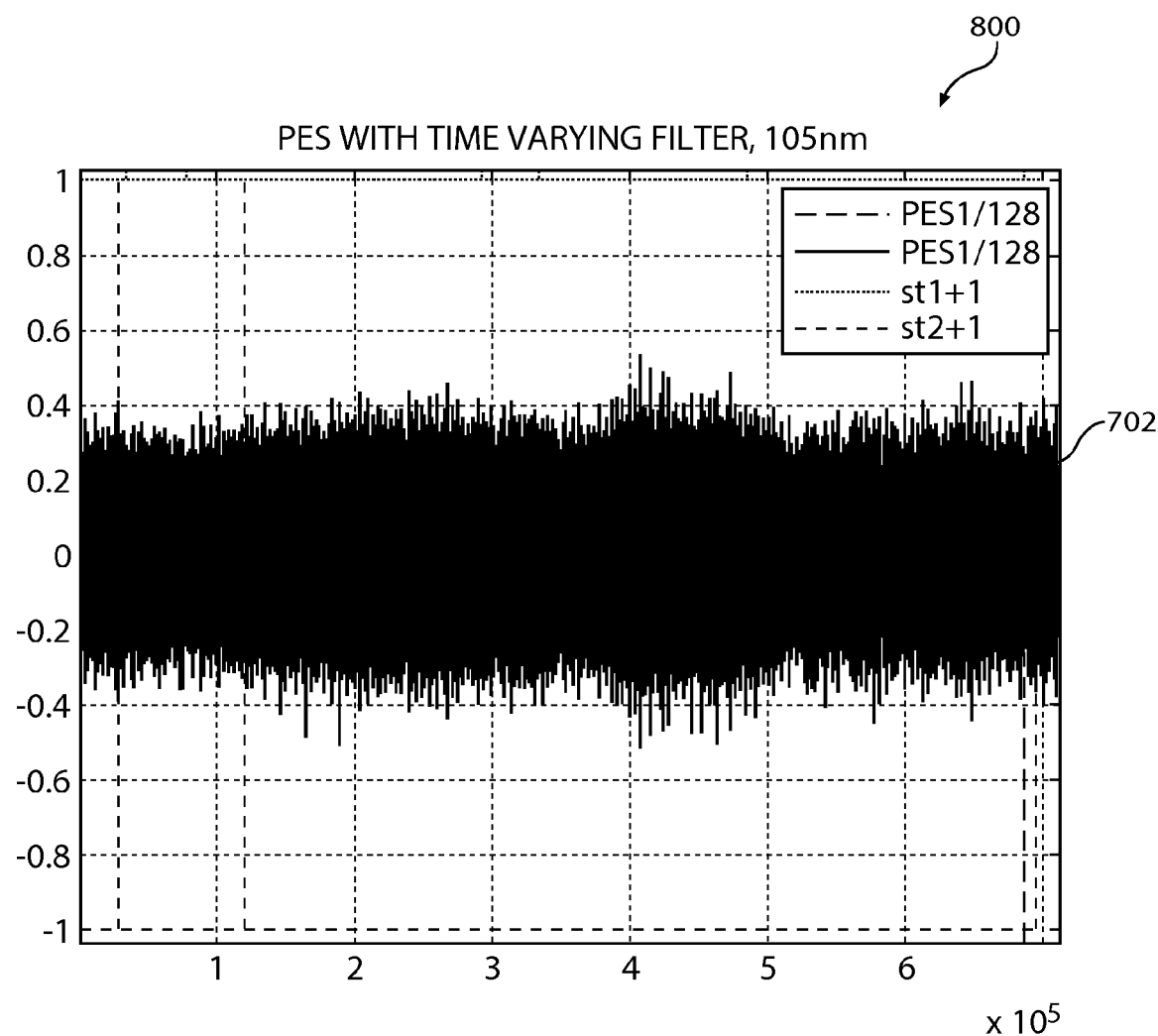
FIG. 8 illustrates a closed-loop position error signal with filtration.

FIG. 7 and FIG. 8 illustrate example graphical representations of PES readings without filtration 700, and with the time-varying filter 604 implemented 800. Graph 700 shows a signal level 702 of PES readings without the time-varying filter 604 implemented. The standard deviation of the PES ($\sigma$-PES) is approximately 116 nm. Graph 800 shows PES signal level 702 with the time-varying filter 604 implemented. The $\sigma$-PES is approximately 105 nm. As illustrated, the present invention compensates for the high-frequency reel disturbances and improves the track-follow performance within the closed-loop controller system 600.

The time-varying filter 604, to suppress the disturbances generated from the tape reels, is implemented with a coefficients update rate that is directly in synchronization with the reel rotation. A typical digital control system is operated at a fixed sampling rate, and a typical sampling rate for a servo track following system is 50 us. At the sampling interrupt, the servo system will read its current position, calculate the PES, then multiply with the compensator, and the time-varying filter 604. Since the disturbance frequency is changing as a function of the reel radius, the filter coefficients have to be recalculated and dynamically updated. These filter coefficient calculations are complex and may take a substantial amount of calculation effort, especially for an implementation of multiple time varying filters. If all calculations take place within the 50 us interrupt, it would increase computation delay time significantly and drastically effected the stability of the overall servo control system.

FIG. 9 illustrates a table 900 illustrating the incremental disturbance frequency change developed under the rotation of the tape reel. Table 900 illustrates the disturbance frequency changes slowly. Per every 10 revolutions of the tape reel, the disturbance frequency changes by only 0.27%. This is due to a small tape thickness (e.g. 6 um) developed onto a larger hub radius (e.g. 22 mm). In other words, many revolutions of the small tape thickness are required to substantially change the tape reel radius. Accordingly, the time-varying filter 604 needs only to be dynamically calculated and updated the once per several rotations (e.g. 10 rotations). The time to develop 10 reel rotations is 230 ms, which account for once per 4600 interrupts. At such an interval, the computation delay time is minimal and is generally not affected.

Figure 10:
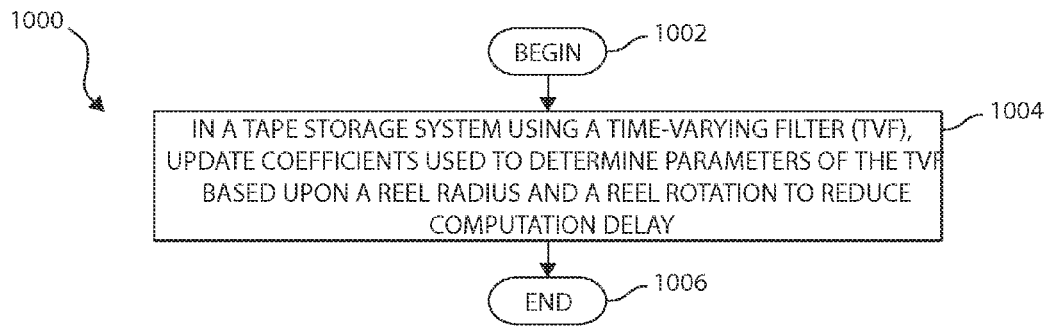
FIG. 10 illustrates a flow chart of a method for improving track-follow performance within a closed-loop tape controller.

FIG. 10 illustrates a method 1000 for implementing the time-varying filter 604 into a track follow mechanism. Starting at step 1002, coefficients used to determine parameters of the time-varying filter 604 are based upon a reel radius and a reel rotation to reduce computation delay (step 1004). The method ends (step 1006).

Figure 11:
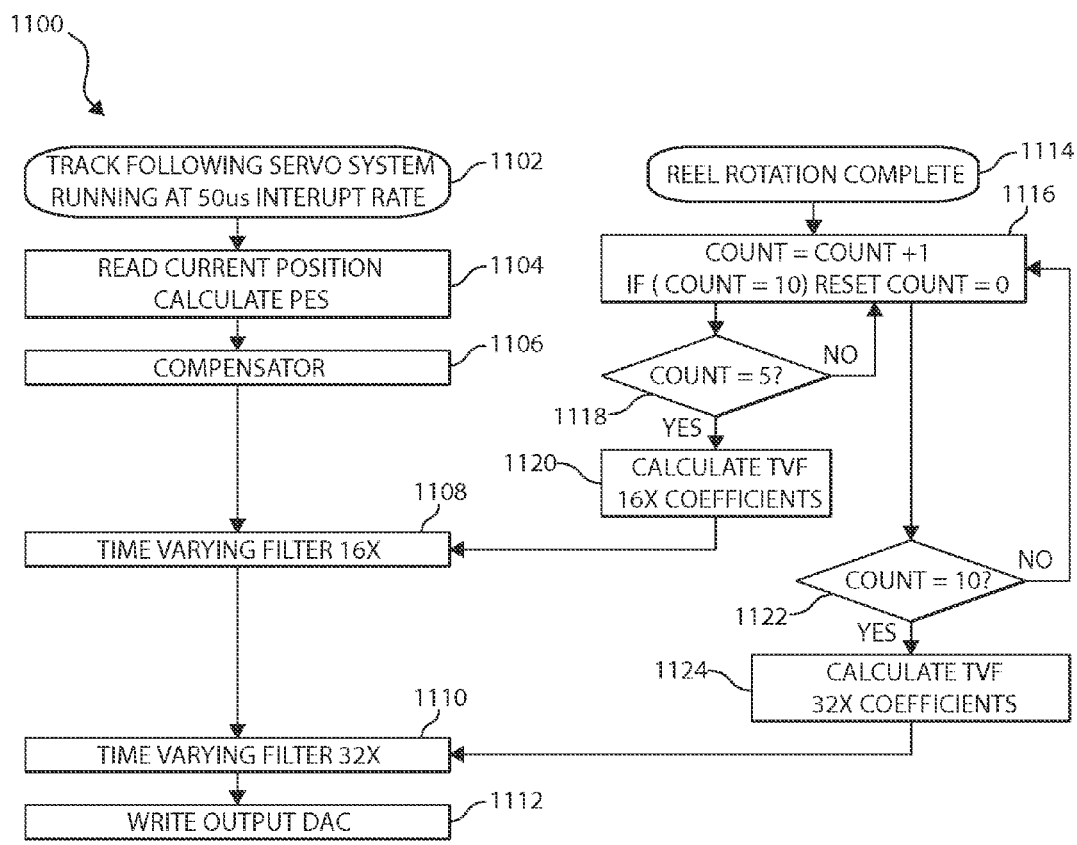
FIG. 11 illustrates an additional flow chart of a method for improving track-follow performance within a closed-loop tape controller.

FIG. 11 further illustrates a block diagram of a digital control system 1100 for implementing the time-varying filter 604 into a track follow mechanism. Shown is a typical digital control system operated at a fixed sample rate (e.g. 50 us) 1102, which at a sampling interrupt will read its current position and calculate the PES 1104, and multiply with a compensator 1106, a 16× time-varying filter 1108, a 32× time-varying filter 1110, and write the output DAC 1112.

In one embodiment, in operation, when a reel rotation completes 1114, a reel rotation count is established 1116. For every reel rotation, one rotation is added to the count until the count reaches 10 rotations, at which the count is reset to 0. System 1100 illustrates the count may be appropriately tailored for the individual implementation of the filtering system. In this example, when the rotation count equals 5 reel rotations 1118, the coefficients for the 16× time-varying filter 1120 are calculated and implemented into the 16× time-varying filter 1108. If the count does not equal 5, the method is returned to the rotation count 1116. If the count is at 10 revolutions 1122, the coefficients for the 32× time-varying filter are calculated and implemented into the 32× time-varying filter 1110. Here again, if the count does not equal 10, the method is returned to the rotation count 1116.

The aforementioned reel count numbers are purely for exemplified illustrative purposes. As noted above, in an individual implementation, the reel rotational number may be changed for the unique operation, depending on the nature and number of time-varying filters deployed. In other words, the coefficients used to determine the time-varying filter parameters may be dynamically calculated and updated every n rotation, in which the n rotation has completed (e.g. 10) reel revolutions.

Additionally, as previously noted, in an individual implementation, multiple instances of the time-varying filter 604 may be deployed on both a supply reel and a take-up reel, as each reel generates its own disturbance frequencies. In other words, multiple filters may be implemented (e.g. 16×, 32× filters) for the supply reel, and multiple filters may be implemented (e.g. 16×, 32× filters) for the take-up reel. The coefficients for the supply reel filters being updated in synchronization with the supply reel rotations, and the coefficients for take-up reel filters being updated in synchronization with the take-up reel rotations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for improving tape storage track-follow control, by a processor device, comprising:
in a tape storage system using a time-varying filter, dynamically updating coefficients used to determine parameters of the time-varying filter based upon a reel radius and a reel rotation to reduce computation delay;
calculating and updating the coefficients used to determine the parameters of the time-varying filter at least once per each of ten revolutions of reel rotation; and
using an H-infinity procedure and a peak filter to determine the parameters for the time-varying filter by using the peak filter for disturbance rejection at a desired multiple of a reel frequency.

2. The method of claim 1, further including repetitively applying the H-infinity procedure on instances from beginning of tape (BOT) to end of tape (EOT) to approximate required functions to set the parameters of the time-varying filter.

3. The method of claim 1, wherein the time-varying filter is written in polynomial form and expressions of the numerator and denominator include a dampening ratio and a natural frequency.

4. The method of claim 3, wherein the expressions are time-varying and defined as functions of a desired reel disturbance frequency.

5. A system for improving tape storage track-follow control, comprising:

at least one processor device, operable within a tape storage system using a time-varying filter, wherein the at least one processor device:

dynamically updates coefficients used to determine parameters of the time-varying filter based upon a reel radius and a reel rotation to reduce computation delay, calculates and updates the coefficients used to determine the parameters of the time-varying filter at least once per each of ten revolutions of reel rotation, and uses an H-infinity procedure and a peak filter to determine the parameters for the time-varying filter by using the peak filter for disturbance rejection at a desired multiple of a reel frequency.

6. The system of claim 5, wherein the at least one processor device repetitively applies the H-infinity procedure on instances from beginning of tape (BOT) to end of tape (EOT) to approximate required functions to set the parameters of the time-varying filter.

7. The system of claim 5, wherein the time-varying filter is written in polynomial form and expressions of the numerator and denominator include a dampening ratio and a natural frequency.

8. The system of claim 7, wherein the expressions are time-varying and defined as functions of a desired reel disturbance frequency.

9. A computer program product for improving tape storage track-follow control within a closed-loop tape controller by at least one processor device operable within the closed-loop controller, the computer program product embodied on a non-transitory computer-readable storage medium having computer-readable program code portions stored therein, the computer-readable program code portions comprising:

a first executable portion that, in a tape storage system using a time-varying filter, dynamically updates coefficients used to determine parameters of the time-varying filter based upon a reel radius and a reel rotation to reduce computation delay;

a second executable portion that calculates and updates the coefficients used to determine the parameters of the time-varying filter at least once per each of ten revolutions of reel rotation; and a third executable portion that uses an H-infinity procedure and a peak filter to determine the parameters for the time-varying filter by using the peak filter for disturbance rejection at a desired multiple of a reel frequency.

10. The computer program product of claim 9, further comprising a fourth executable portion that repetitively applies the H-infinity procedure on instances from beginning of tape (BOT) to end of tape (EOT) to approximate required functions to set the parameters of the time-varying filter.

11. The computer program product of claim 9, wherein the time-varying filter is written in polynomial form and expressions of the numerator and denominator include a dampening ratio and a natural frequency.

12. The computer program product of claim 11, wherein the expressions are time-varying and defined as functions of a desired reel disturbance frequency.

* * * * *